United States Patent
Pretlove et al.

(10) Patent No.: US 7,353,082 B2
(45) Date of Patent: Apr. 1, 2008

(54) METHOD AND A SYSTEM FOR PROGRAMMING AN INDUSTRIAL ROBOT

(75) Inventors: John Pretlove, Sandvika (NO); Charlotte Skourup, Drammen (NO); Thomas Pettersen, Borgenhaugen (NO)

(73) Assignee: Abb Research Ltd., Zürich (CH)

( * ) Notice: Subject to any disclaimer, the term of this patent is extended or adjusted under 35 U.S.C. 154(b) by 0 days.

(21) Appl. No.: 10/995,943

(22) Filed: Nov. 24, 2004

(65) Prior Publication Data

US 2005/0256611 A1   Nov. 17, 2005

(30) Foreign Application Priority Data

Nov. 24, 2003   (SE) .................................. 0303178

(51) Int. Cl.
   *G05B 15/00* (2006.01)
(52) U.S. Cl. .................... 700/264; 700/245; 700/259; 318/568.2
(58) Field of Classification Search ................ 700/245, 700/259, 264; 318/568.2
   See application file for complete search history.

(56) References Cited

U.S. PATENT DOCUMENTS

| | | | | |
|---|---|---|---|---|
| 4,945,493 | A * | 7/1990 | Huang et al. ................ | 700/251 |
| 5,748,854 | A | 5/1998 | Watanabe et al. | |
| 5,845,053 | A | 12/1998 | Watanabe et al. | |
| 6,507,163 | B1 * | 1/2003 | Allen ........................ | 318/560 |
| 6,535,793 | B2 * | 3/2003 | Allard ........................ | 700/259 |
| 6,757,586 | B2 * | 6/2004 | Milojevic et al. ........... | 700/245 |
| 6,845,295 | B2 * | 1/2005 | Cheng et al. ................ | 700/245 |
| 6,845,297 | B2 * | 1/2005 | Allard ........................ | 700/259 |
| 7,039,500 | B2 * | 5/2006 | Milojevic et al. ........... | 700/245 |
| 7,079,924 | B2 * | 7/2006 | Galbraith .................... | 700/245 |

(Continued)

FOREIGN PATENT DOCUMENTS

| | | |
|---|---|---|
| DE | 19626459 A1 | 1/1998 |
| WO | WO 03099526 A1 | 12/2003 |

OTHER PUBLICATIONS

Veyha et al., Method and system for robot end effector path correction using 3-D ultrasound sensors, 2000, IEEE, p. 1240-1243.*

(Continued)

*Primary Examiner*—Thomas Black
*Assistant Examiner*—Marc McDieunel
(74) *Attorney, Agent, or Firm*—Venable LLP; Eric J. Franklin

(57) ABSTRACT

A method and a system for use in connection with off-line programming of an industrial robot. The robot is taught a path having a number of waypoints located on or in the vicinity of at least one object to be processed by the robot. The system includes a tracking system unit adapted to provide information about the position of a part of the body of an operator pointing by the part at points on or in the vicinity of the object, a visual feed-back unit generating a visual feed-back to the operator of the position of the point being presently pointed at by the part of the body, in relation to the object, and a storage unit adapted for storing the position of the part of the body as a waypoint upon receiving a recording command.

29 Claims, 3 Drawing Sheets

U.S. PATENT DOCUMENTS

| | | | |
|---|---|---|---|
| 2002/0181773 A1 | 12/2002 | Higaki et al. | |
| 2004/0189675 A1* | 9/2004 | Pretlove et al. | 345/633 |
| 2004/0193321 A1* | 9/2004 | Anfindsen et al. | 700/257 |
| 2005/0149231 A1* | 7/2005 | Pretlove et al. | 700/264 |
| 2005/0251290 A1* | 11/2005 | Skourup et al. | 700/245 |

OTHER PUBLICATIONS

Vaughan et al., Exploiting task regularities to transform between reference frames in robot teams, 2002, IEEE, p. 2599-2605.*

Dixon et al., Predictive robot programming, 2002, IEEE, p. 876-881.*

Vaughan et al., LOST: Localization-space trails for robot teams, 2002, IEEE, p. 796-812.*

Soshi Iba, Christiaan JJ. Paredis, and Pradeep K. Khosla: Interactive Multi-Modal Robot Programming; Proceedings of the 2002 IEEE; May 2002; pp. 161-168.

Soshi Iba, J. Michael Vand Weghe, Christiaan JJ. Paredis and Pradeep K. Khosla; An Architecture for Gesture-Based Control of Mobile Robots; Proceedings of the 1999 IEEE/RSI; pp. 851-857.

D Guo, X. M. Yin, Y. Jin and M. Xie; Efficient Gesture Interpretation for Gesture-based Human-Service Robot Interaction, six pages.

* cited by examiner

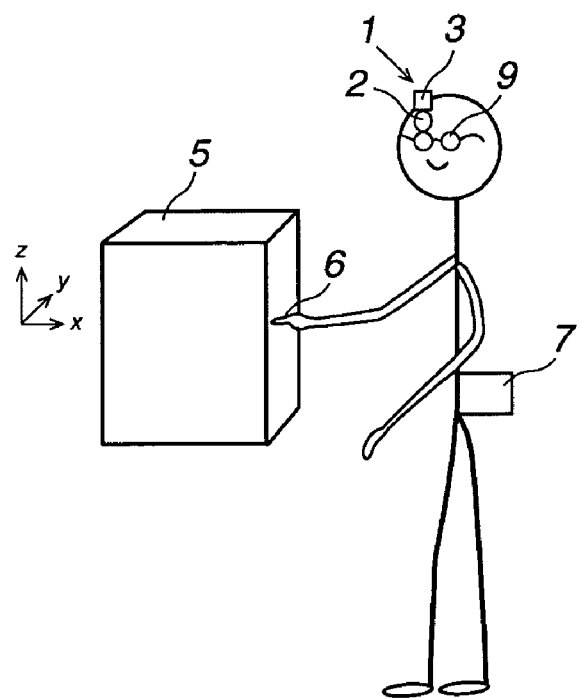
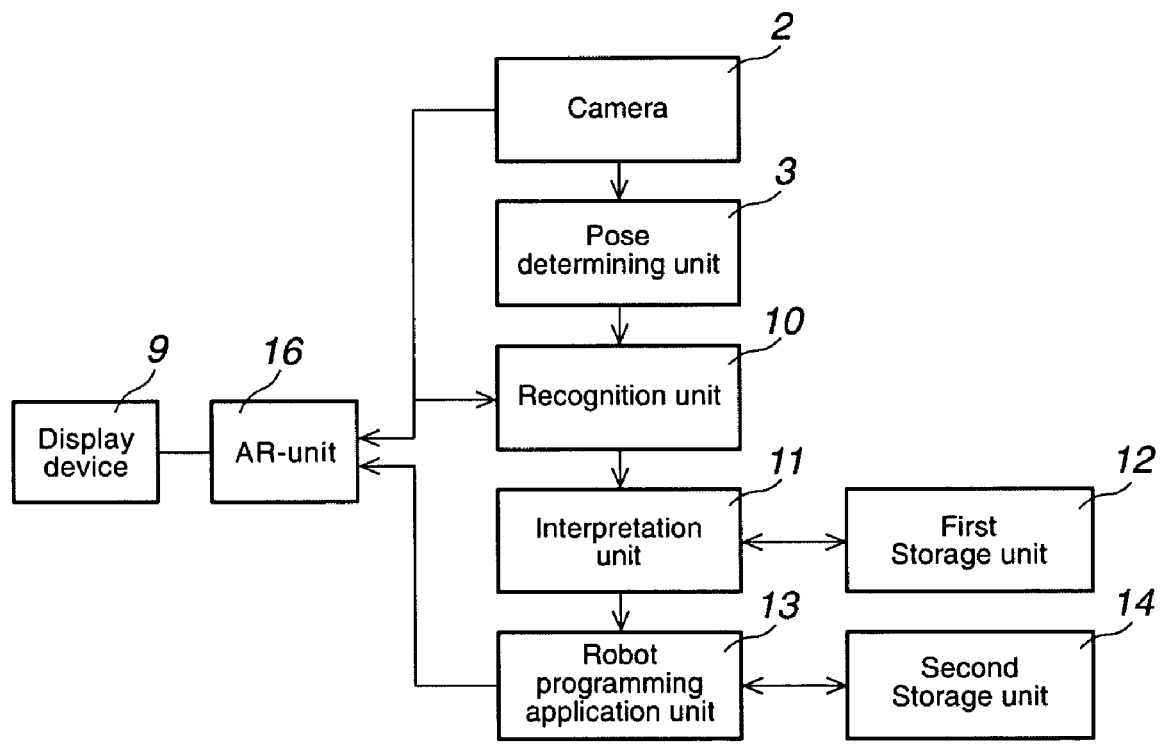
Fig. 1
Fig. 2

METHOD AND A SYSTEM FOR PROGRAMMING AN INDUSTRIAL ROBOT

CROSS-REFERENCE TO RELATED APPLICATIONS

This application claims priority to Swedish patent application 0303178-8 filed 24 Nov. 2003.

FIELD OF THE INVENTION

The present invention relates to a method and a system for off-line programming of an industrial robot, comprising teaching the robot a path which has a number of waypoints located on or in the vicinity of an object to be processed by the robot. The invention is particularly suitable for programming an industrial robot, in a surface processing application, such as painting, polishing, grinding, gluing, coating and welding. The invention is also useful in connection with processing, such as packing, picking and placing of objects, riveting, de-burring, fettling, dry spraying, folding plate, bending plate, hemming plate, gripping an object, manipulating an object and stacking. The invention is also suitable for programming a mobile robot in an industrial installation or commercial installation or health care facility or place of work.

PRIOR ART

Robots are often used for processing the surface of an object. Existing practice for programming a robot involves teaching the robot a sequence of waypoints. The waypoints define the path, which the robot shall follow during the processing of the object. A waypoint comprises three-dimensional position and three-dimensional orientation information. The robot is taught how to perform the task by being guided through the various waypoints along the desired operating path during the programming. These waypoints are stored as instructions into a memory in the robot control unit. During operation of the robot, the program instructions are executed, thereby making the robot operate as desired.

Generally, the robot is programmed to perform a task by an human operator who manually jogs the robot to the desired positions along the path using a movable programming unit, a so-called teach pendant. An industrial robot usually carries an end-effector comprising a tool for performing the processing, for instance a welding tool or a painting tool. During programming of the path, the operator has to position and orient the end-effector in each waypoint along the path.

For on-line programming of an industrial robot it is known to use human gestures for jogging the robot during the teaching of the robot program. Guo, D., Yin, X. M., Jin, Y. and Xie, M. disclose such a programming method in the publication "Efficient gesture interpretation for gesture-based human service robot interaction", in proceedings of the International Conference on Field and Service Robotics, Aug. 29-31, 1999, Pittsburgh, Pa., pp. 274-279. This paper presents a gesture-based robot programming method for service tasks, such as maintenance, transport, and manipulation. The system uses vision-based recognition of body gestures. The human can control the service robot, for example, where to go or look, when to move, speed up or stop, based on different human gestures. The service robot can easily acquire the geometrical information of the target object. The human gestures are defined by the spatial position of the upper body of an operator. A 3D model of the human body is built and the gestures are transferred to that model. The human upper body is separated from a complex image background by means of "color based gesture segmentation". A neural network is capable of performing adaptive pattern classification by applying the supervised training algorithm to generate prototypes and define values of network connections.

An on-line method for programming mobile robots based on hand gestures is described in the publication "An architecture for gesture-based control of mobile robots" by Iba, S., Weghe, J. M. V., Paredis, C. J. J. and Khosla, P. K., in proceedings of the IEEE/RSJ International Conference on Intelligent Robots and Systems (IROS 1999), vol. 2, pp 851-857. This document describes a method for programming a mobile robot based on hand gestures. The robot programming method uses a dataglove (CyberGlow) and an electromagnetic 6DOF position sensor to determine human hand gestures. A geolocation system tracks the position and orientation of a mobile robot. The document further describes a gesture spotting and recognition algorithm based on a Hidden Mark of Model (HMM). HMMs are commonly used in speech recognition, handwriting recognition, and gesture recognition.

Another method for on-line programming of a mobile robot based on hand gestures is disclosed the publication, "Interactive Multi-robot Programming", by Iba, S., Paredis, C. J. J. and Kohsela, P. K, in proceedings of the International Conference on Robotics and Automation (ICRA) 2002, Washington D.C., May 11-15, 2002, pp 161-168. This document describes how to translate hand gestures and spontaneous speech into a structured symbolic data stream without abstracting away the user's intent by means of multi-model recognition. The document further discloses how to select the appropriate set of primitives based on the user input, the current state, and the robot sensor data by intention interpretation. Further, the document discloses prioritized task execution by selecting and executing primitives based on the current state, sensor input, and the task given by the previous step. The document describes a combination of hand gestures, i.e. single-hand gestures and two-handed gestures, and speech.

An alternative to on-line programming is off-line programming. For example, if a 3D CAD model of the object exists, a person with a computer scientist background teaches the waypoints in a robot simulation system. A difference between on-line and off-line programming is that during on-line robot programming, the user controls the robot and immediately sees the robot movement as a result. Existing methods based on the CAD approach provide visual feedback in a virtual world, i.e. a virtual representation of the real world and the real object.

Either way, the teaching process is time consuming, troublesome, error prone, and in almost all cases requires several iterations before the program is acceptable. The CAD approach is costly and not always intuitive to use. The complexity of the CAD-system requires the operator who is programming the robot to have knowledge about computer science. Such a person usually has little or no knowledge about the industrial process the robot shall carry out. In the case of manual teaching, the control of the process is often difficult to optimize, but it has the advantage of indirectly utilizing implicit process knowledge of the operator.

OBJECTS AND SUMMARY OF THE INVENTION

The object of the present invention is to provide an improved industrial robot programming solution, which reduces the teaching time for the teaching process and increases the quality of the processing result.

According to one aspect of the invention, this object is achieved by the method of the invention as defined in claim 1.

The method according to the invention uses human gestures to carry out off-line robot programming. Gestures have a rich and intuitive form of interaction, which is generally more natural to use than most conventional interaction techniques. Particularly for robot programming, it is logical to point at an object and indicate which path to follow. The operator uses a part of his body, for example a finger, to point out the path to be followed by the robot in relation to the object to be processed. However, it is difficult to point out a position with high accuracy by means of a hand or a finger. To improve the accuracy and makes it easier for the operator to view the exact position he is pointing at, a visual feedback is generated of the position of the point being presently pointed at in relation to the object. A part of the operator's body, a so-called pointing part, is selected for pointing out the positions of the waypoint on the object. The pointing part of the body is, for example, a finger, a hand, or an arm.

Further advantages achieved by the method according to the invention, include that the programming time and complexity can be reduced and the program quality can be increased. The operator has the flexibility to move around the object without restrictions and pointing out the waypoints of the path to be programmed. The method according to the invention simplifies the robot programming process and hides the underlying technical system from the operator, so that the operator can concentrate on the real task: to make a new robot program. The operator does not need any particular computer knowledge and he uses his knowledge and experience about the process during teaching the robot. The method is very intuitive and easy to use. The operator indicates by gestures where the robot should move and what it should do. The operator will work directly on the real object with his hand or hands, and not via any input device. The operator will not need to learn about different systems including robot programming code for making new robot programs. The method is an off-line robot programming method, i.e. the programming is performed with no need of a real robot. There is no need either for any 3D model, for example, a CAD model of the object as the method allows the operator to work directly with the real object which is a significant advantage compared to the prior art.

According to an embodiment of the invention, said generation of a visual feedback to the operator comprises: generating a graphical representation of the point being presently pointed at by said part of the body of the operator, and displaying a view comprising the object and said graphical representation projected on the object based. By visualizing the point pointed at by the operator in real time and in relation to the real object to be processed, it is easier for the operator to decide when the waypoint has the desired position and orientation. Computer generated information, representing the point pointed at by the operator, is displayed or visualized projected on the object.

One way of providing the visual feedback is by means of augmented reality (AR). An augmented reality system merges computer-generated graphics with the user's space in the real world. In this embodiment, the computer-generated graphics of the points are merged with an image of the real object. Alternatively, the computer-generated graphics is displayed on see-through glasses worn by the operator. The generated graphics are projected on the glasses, so that the operator can see the point he is pointing at projected in relation to the real world and the object.

According to an embodiment of the invention, a graphical representation of the stored waypoint, or stored waypoints, are generated, and a view is displayed comprising the object and the graphical representation of the stored waypoint and the point being presently pointed at by the operator. The programming method is further improved by visualizing recorded information about the waypoints of the robot path in relation to the real object to be processed. Thus, the operator can immediately see the result of what he has been teaching. It is no longer necessary to run the robot program to view the result of the programming. Thereby, the number of iterations needed and thus the teaching time is reduced.

According to an embodiment of the invention, the method further comprises generating a graphical representation of the path between the latest stored waypoint and the point presently being pointed out. By visualizing the path between the latest stored waypoint and the point, which the operator is presently pointing at, it is easy for the operator to estimate when the point is suitable as a waypoint. Preferably, the method further comprises generating a graphical representation of the path between at least some of the stored waypoints. By showing the path between the waypoints, it is simple for the operator to see whether he has missed some part or parts of the object and to see which parts of the objects are left to cover.

According to an embodiment of the invention, the position of the pointing part of the body is determined in relation to the object, based upon an image of the object and the pointing part of the body. For instance the position is determined by image recognition. Preferably, the image of the object is obtained by means of a camera. It is advantageous to use the same image, from the same camera, as used for generating the visual feedback to the operator, to determine the position of the point being presently pointed at by the operator.

According to an embodiment of the invention, information about the orientation of the pointing part of the body of the operator is received, and the orientation and position of the pointing part is stored as a waypoint upon receiving the recording command. During programming of the robot, the operator also needs to teach the robot how to orientate the tool. The operator shows the desired orientation of the tool by orientating the pointing part of his body as the desired tool orientation. For example, the orientation of the finger, the hand or the arm of the operator shows the desired tool orientation.

According to an embodiment of the invention, the method comprises: storing at least one predefined gesture representing a specific command, obtaining information about the configuration and/or movements of a part of the body of the operator, recognizing a gesture based on the obtained information about said part of the body, and interpreting the command by comparing the recognized gesture with the predefined gesture representing the command. Preferably, the predefined gesture represents the recording command and the obtained information is hand-motion gestures. According to the invention, human gestures are used for interacting with a programming system. Either the same part of the body as used for pointing out the position and orientation of the waypoints, i.e. the pointing part, can be used for generating commands to the system, or another part of the body can be used. It is advantageous for the operator to use his body for teaching both the waypoints and for generating the recording command.

According to an embodiment of the invention, the method comprises storing a plurality of predefined gestures, each representing a specific command, recognizing gestures based on the obtained information about configuration and/or movements of the body, interpreting the recognized gestures by comparing a recognized gesture with the stored predefined gestures, and executing the command represented by the recognized gesture. This embodiment makes it possible for the operator to give commands to the programming system by using gestures. The commands include for example start process, stop process, OK, cancel, select waypoint, move waypoint and delete waypoint. Thus, the operator has the flexibility to move around giving commands without any restrictions.

According to an embodiment of the invention, the method comprises storing a plurality of predefined gestures, each representing a specific piece of process-related information, obtaining information about the configuration and/or movements of said part of the body of the operator, recognizing gestures based on the obtained information about said part of the body, and interpreting the recognized gestures by comparing a recognized gesture with the stored predefined gestures, and generating robot programming code based upon the process-related information represented by the recognized gesture. This embodiment makes it possible for the operator to also record process-related information in connection with the waypoints by using gestures. The process-related information is, for example, tool configuration and tool speed.

According to a further aspect of the invention, the object is achieved by a computer program directly loadable into the internal memory of the computer or a processor, comprising software code portions for performing the steps of the method according to the invention, when said program is run on a computer. The computer program product is provided either on a computer readable medium or through a network, such as the Internet.

According to another aspect of the invention, the object is achieved by a computer readable medium having a program recorded thereon, when the program is to make a computer perform the steps of the method according to the invention, and said program is run on the computer.

According to still another aspect of the invention, the object is achieved by the system of the invention as defined in claim 17. The invention relates to a system for using human gestures as input for generating robot programs and for interacting with the system. Using gestures, the operator teaches a new robot path in relation to a real object. The system recognized the operator's gestures and translates these into waypoints. Further, the system recognized predefined gestures representing specific functionalities, such as commands, process related information, and process events.

According to the invention, it is possible to use gestures for specification of process related events along the path. The system uses a tracking method or a combination of several tracking methods to recognize the user's gestures. The gestures are interpreted in relation to the object and the context.

BRIEF DESCRIPTION OF THE DRAWINGS

The invention will now be explained more closely by the description of different embodiments of the invention and with reference to the appended figures.

FIG. 1 shows a system for use in connection with off-line programming of an industrial robot according to an embodiment of the invention.

FIG. 2 shows a block scheme of a system according to an embodiment of the invention.

DETAILED DESCRIPTION OF PREFERRED EMBODIMENTS OF THE INVENTION

Figure 3:
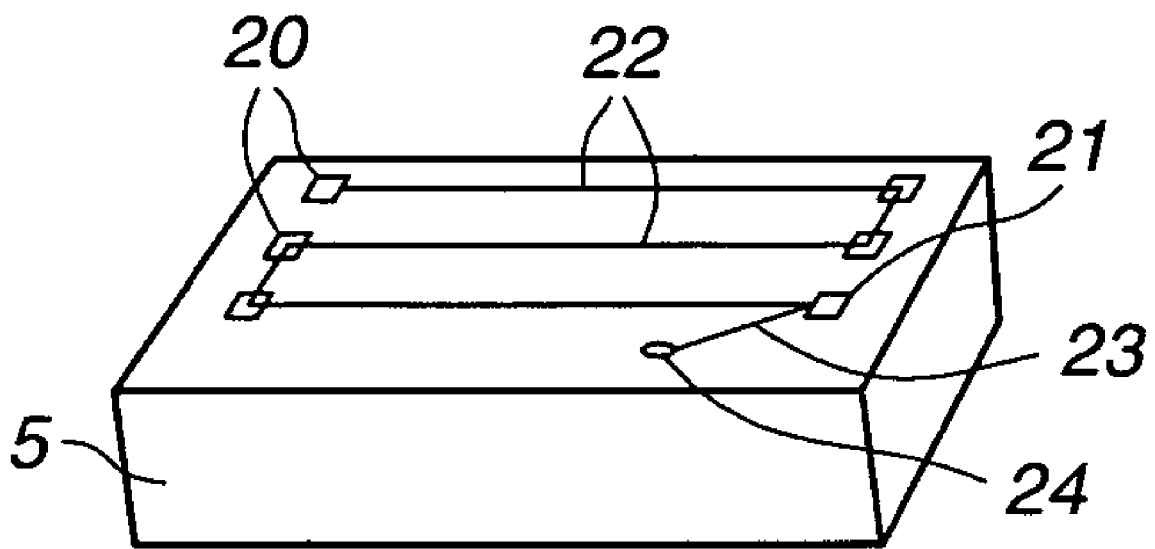
FIG. 3 shows an example of an augmented reality view showing a graphical representation of waypoints projected on a real object.

FIG. 1 illustrates a system for use in connection with programming of an industrial robot according to the present invention. The system comprises a tracking system unit 1, adapted for tracing positions, orientations, movements and configurations of the body or a part of the body, such as an arm, a hand, or a finger of an operator. The tracking system unit 1 comprises a tracking unit 2 adapted for providing information about the position of a part of a body of an operator pointing at points on or in the vicinity of the object, and a pose determining unit 3, which is adapted to determining the position and orientation in six dimensions (6D) of the part of the body in relation to the object, based upon the information provided from the tracking unit 2. The tracking system unit 1 according to this embodiment is vision-based and comprises a camera 2 adapted to deliver an image of the object and at least one finger of the operator. The pose determining unit 3 is adapted to determine the position and orientation of the finger based on the image from the camera.

The pose determining unit 3 can also be used for specifying a word coordinate system. Further, the tracking system unit is used to determine the position and orientation of a display member 9. The tracking system unit 1 may either be worn by the operator or be fixed at the teaching location. The operator uses his fingers and hand for teaching the robot how to process an object 5. In this embodiment the operator uses a finger 6 to point out the position and orientation of the waypoints. More precisely, the tip of the finger is used for pointing out the position of the waypoint and the extension direction of the finger is used for showing the orientation of the waypoint. The teaching comprises teaching the robot a path including a number of waypoints given in a specific sequence and located on or in the close vicinity of the object 5. Each waypoint comprises the position and the orientation of the processing tool, such as a paintbrush or a welding tool, in the point. A waypoint may also include data related to the processing.

In this embodiment, the operator uses one of his fingers for pointing points on the object, which he wants to include in the path. The operator orientates the finger as he wishes the processing tool to be oriented in the point. The operator records the point by making a gesture, for example, with another finger, which gesture represents a recording signal to the system. Upon recognizing the recording gesture, the system stores the position and orientation of the point as a waypoint. For example, the tip of one of the fingers can be used for pointing out the position of the waypoint. The position and orientation of the finger can be tracked in a number of different ways. In this embodiment the tracking unit 2 is a camera and the position and orientation of the body part is determined by image recognition. In another embodiment the tip of the finger could be provided with a tracking unit including a sensor for determining the position and orientation. Examples of sensors and technologies for determining positions and orientations are computer vision, inertial sensing, ultrasonic sensing, and magnetic sensing, accelerometers, gyros, laser technology, and Global Positioning System (GPS).

The camera 2 is arranged so that the object 5 to be processed and the part of the operator's body used for teaching the waypoints are in the field of view of the camera. The camera can either be fixed in a space or moved around. For instance, the camera can be attached to an operator's head or elsewhere on his body. All types of cameras can be used, but the demand for accuracy of position and orientation determines the type of camera. For example, a web camera, a video camera, or a CCD camera could be used. The camera 2 provides either an analogue or a digital video signal, which is transferred to the pose determining unit 3. The position of the object 5 is given in an object coordinate system.

The pose determining unit 3 determines the position and orientation of the finger in relation to the object 5 based upon the received video signals from the camera 2. The information about the position and orientation is transferred together with the video signals from the camera 2 to a wearable computer 7. Alternatively, a stationary computer can be used. The wearable computer 7 contains the necessary software in order to perform the desired task or process, e.g. generating a robot program and performing a visibility check based on data from the pose determining unit 3 and from the camera 2. The wearable computer 7 also comprises one or more storage units and software for recognizing and interpreting gestures. Communication of the information from the tracking system unit 1 to the wearable computer 7 is done through a wired or wireless link.

A display member 9 visualizes the view of the camera combined with computer generated graphics, which, in this case are the point being presently pointed at by the finger of the operator, the recorded waypoints, and the path between the points. In this embodiment, the display member 9 is a pair of wearable glasses. Other types of displays, such as a computer screen, a tablet PC screen, a personal digital assistance (PDA) screen or a head-mounted display could also be used. The operator will wear the glasses, on which the computer-generated information screen is projected in relation to his position in the room. The operator may wear a head-mounted display or glasses and see the real world including his gestures combined with computer generated graphics representing, for example, the inputted waypoints, events, and process specific information.

During programming, the operator points at the object and indicates between which points the processing should take place. The operator uses different types of gestures: hand-motion gestures and symbolic gestures. Hand-motion gestures are free motions, such as a curve representing the robot path. Hand-motion gestures basically represent robot target points and events. The robot target points and events are given as positions and orientations. Symbolic gestures have a one-to-one matching of intention. Such gestures are typically used for system functionality, for instance start/stop, OK/cancel, menu, scroll up/scroll down, copy/paste, save, load and exit. The operator utilizes a variety of these gestures to mimic the path of surface processing in relation to the object, and to interact with the programming system.

The operator will need feedback from the system on his inputs and actions. In this embodiment, the system feedback is provided by visual augmented reality (AR). The visual system feed-back could also be combined with other techniques for system feedback, such as audio or tactile feedback e.g. vibrations, temperature, taste and smell. In this embodiment, the operator wears a head-mounted display or glasses and sees the real world including his gestures combined with computer generated graphics representing, for example, the input target points, events, and process specific information, such as speed, the robot path, and an estimation of the process result.

FIG. 2 shows a block scheme of a system according to the invention. The operator uses his body to make gestures, which are traced by the pose determining unit 3. The pose determining unit 3 receives information about the position and movements of the body of the operator from the camera 2. The pose determining unit 3 determines the position and orientation of the body and the display device in relation to the object based upon the received video signals from the camera by means of image recognition. The pose determining unit 3 is also used for specifying a world coordinate system. The system comprises a gesture-recognition unit 10 adapted for recognizing gestures based on information provided from the camera 2 and the pose determining unit 3. The recognition unit 10 also extracts data and transforms the data into a format that is suitable for interpretation.

A gesture interpretation unit 11 interprets the recognized gestures by comparing the recognized gesture with a plurality of predefined gestures stored in a first storage unit 12. The predefined gestures represents commands and pieces of information such as process related information. Examples of interpretation algorithms suitable for the invention are color-based gesture segmentation, Hidden Markov Model, estimation of joint angles, and neural networks. For example, one gesture represents "turn on the process" and another gesture represents "turn off the process". If the process to be programmed is painting, one gesture indicates "turn on the paint" and one gesture indicates "turn off the paint". The process related information is for example brush numbers. In a paint application it is possible to select one or several options for the paintbrush, which options are stored in the robot controller. Thus, it is possible to define a gesture for each option for the paintbrush.

The following examples of commands can be interpreted by the system: select point or event insert point or event, move point or event, delete point or event, edit point or event, record point or event. Points are defined with position and orientation. Events are defined only with position.

The first storage unit 12 enables saving and loading of application related information, e.g. predefined gestures and related functions and system configuration parameters, such as local coordinate frames. The interpretation unit 11 interprets the body or body part positions, or movements and translates these into specific unit predefined actions or commands.

Recorded waypoints are stored in a second storage unit 14. The system further comprises a robot programming application unit 13 comprising a robot programming code generator generating robot programming code based upon the stored waypoints and process related information. Further, the application unit 13 holds information regarding the coordinate frame including the robot coordinate system. Hence, the application unit is dependent on the system use. The robot program application unit 13 receives the interpreted gestures from the interpretation unit 11 and executes the desired actions or commands.

When teaching the robot, the operator records waypoints to be passed through during the processing of the object and he also records process related information in connection with the waypoints by using gestures. During the teaching, the operator moves his hand and positions the tip of the finger at points on or in the vicinity of the object and if the operator is satisfied with the location of the point, he records the point by showing a gesture representing a record command. The robot program application unit 13 receives the interpreted gestures from the interpretation unit 11 and executes the desired actions or commands. In connection to each recorded waypoint, the operator makes a gesture indication whether the processing should be on or off. The operator also shows gestures representing process related information, such as specification for the tool configuration.

As the operator records waypoints representing the path on the object, computer generated information is visualized on the display 9. Thus, the operator gets real time visual feedback on his gestures. In this embodiment, the visual feedback is achieved by means of augmented reality. The system comprises an augmented reality unit 16 comprising a graphical generator, generating a graphical representation of the point being presently pointed at by the operator and of stored waypoints and a registering unit registering the generated graphical representation to the image of the object to provide a composed augmented reality image. Before the first point is recorded, the display 9 shows the object and a point representing the present position of the tip of the operator's finger.

The display 9 may also show the orientation of the operator's finger. When the operator records a point, the waypoint is visualized, for example, as a dot on the display. FIG. 3 is an example of a view shown on the display during the teaching. The view comprises the object 5 and the graphical representation of recorded waypoints 20, 21, and the path 22 between the waypoints projected on the object 5. A line 23 between the latest recorded waypoint 21 and the point 24 being presently pointed out by the operator, in this embodiment the tip of the finger of the operator, is visualized and displayed. This line 23 is virtual, i.e. it is generated by the computer and visualized as computer generated information and operates like a rubber band between the latest recorded waypoint and the tip of the finger of the operator. When the operator records a new waypoint, the virtual line 23 becomes fixed between the two waypoints. It is also possible to include a graphical representation of the orientation of the point being pointed at by the operator and the recorded waypoints. The orientation is illustrated, for example, by three octagonal axes, x, y, z.

To be able to generate a complete robot program, the system needs information about the configuration of the robot in the robot cell. A configuration file must be available. The operator can, for instance, generate these data from the computer. The configuration file contains data, such as configuration data stored in the robot controller, a definition of the robot tool, a definition of the object coordinate system, and other relevant data.

The waypoints recorded by the operator represent an extract of the real and exact robot path. The robot programming application unit 13 determines the real position and orientation of the waypoints including both recorded points and process events. For example, process events may always be located at a vector between two points. The exact position of the events can first be determined when the operator has finished the recording of waypoints.

The recording of waypoints and process related information is not limited to a sequential process. The operator can also select a stored waypoint and make it active and progress teaching from this waypoint acting as the latest recorded waypoint. A virtual line from both the active waypoint and the waypoint originally subsequent to the active waypoint will be visualized and connected to the point presently pointed out by the operator. The operator continues the intermediate sequence until it is complete and selects a new active point, which may be the latest recorded point in the original sequence.

As the operator has finished the teaching sequence of waypoints and a configuration file exists, the robot programming application unit 13 takes the recorded waypoints and the configuration file as input and generates a robot program with the right syntax for the specific robot controller. Then, a robot program code generator generates the robot program code. The robot program generator can be any robot programming code generator know to those skilled in the art. The tasks of the robot program code generated are: locating recorded points at the right places in relation to the real path of the robot, generating the right syntax, and translating the input to the robot to a programming language. The robot program is either downloaded to the robot controller, so that the robot can execute the program or integrated into a larger robot program as a module in case the robot program contains a sequence of different objects.

The user starts a session at the teaching location which may take place anywhere with enough space for the object, the equipment, the user, and the user's gestures around the object. A fixed world coordinate system needs to be specified at the teaching location. One way of doing this is by an n-calibration method, where the user specifies a number of points describing the position and orientation of the coordinate system. All positions and orientations provided by the tracking system unit will be in relation to this word coordinate system. The user starts specifying a robot program by specifying points or process specific events in relation to the object.

Figure 4:
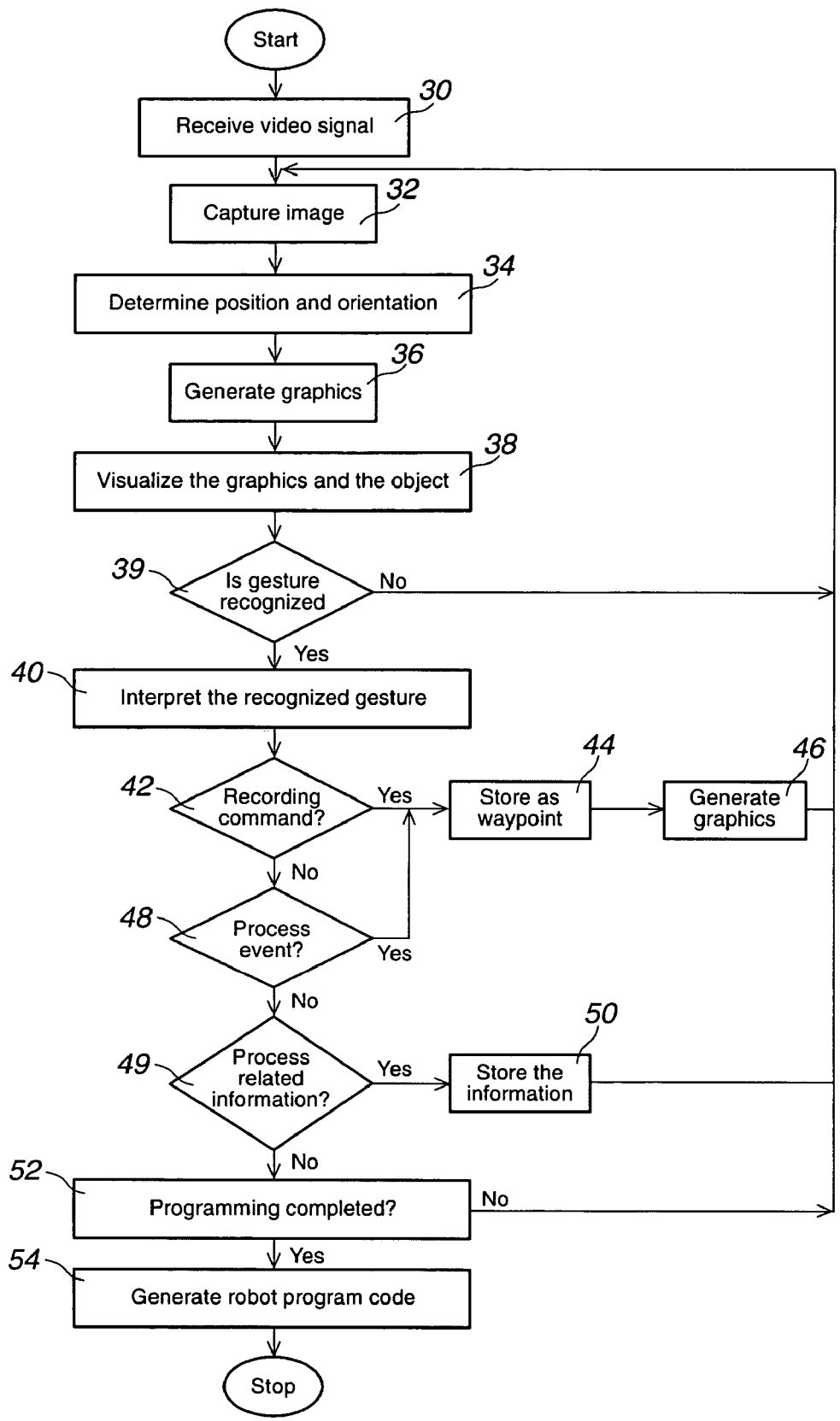
FIG. 4 shows a flow chart of a method according to the invention for teaching an industrial robot a path.

FIG. 4 is a flowchart illustration of a method and a computer program according to an embodiment of the present invention. It will be understood that each block of the flowchart can be implemented by computer programming instructions. In block 30, a continuous stream of video signals is received from the camera. In block 32, an image is captured for use by the image recognition. The position and orientation of the point pointed out by the operator is determined by image recognition. The image recognition uses, for example, one or more markers with unique IDs, provided in a fixed relation to the object 5. A pointing marker could also be attached to the body of the operator. The function of the marker is to provide the image recognition algorithm with a reference point in the world coordinate system, to which the computer generated graphics should be related. Alternatively, an algorithm could be used for recognizing the contour line of the finger or hand of the operator. In another alternative embodiment, the hand or finger of the operator could be provided with a device, for example a ring, to be used as a reference for determining the position and orientation. The position and orientation of the body part used for pointing out the waypoints are calculated in relation to the location of the object or in relation to reference markers, block 34.

A graphical representation is generated of the point being presently pointed out by the operator, in this embodiment of the tip of the finger of the operator, block 36. The graphics generated include the point being presently pointed out by the operator. If one or more waypoints have been previously recorded, graphics already exist including the recorded waypoints, and the generated graphics of the point being presently pointed out are added to the existing graphics. Graphics representing a line between the last recorded waypoint and the point being presently pointed out are also generated. The received video signal is combined with the generated graphics, including registering the generated graphical representation to the image of the object to provide a composed augmented reality image. A view of the combined video signals and graphics is displayed, block 38.

Thereafter, gestures are recognized from the captured images. If a gesture is recognized, it is interpreted and compared with the predefined gestures stored in the first storage unit, block 40. If the recognized gesture represents a recording command, the position and orientation from block 34 are stored as a waypoint in the second storage unit, block 44, and graphics are generated representing the stored waypoint, block 46. If the recognized gesture represents a process event, block 48, the process event is stored together with the position and orientation as a waypoint, and graphics are generated. If the recognized gesture represents process related information, block 49, the process related information is stored together with the last stored waypoint. When the program is completed, block 52, robot program code is generated, block 54.

The software used for implementing the invention is partly based on software known to those skilled in the art. For example, the position and orientation may be generated in ARTtoolKit based on the position and orientation of the pointing marker in relation to the reference marker. The ARTtoolKit is developed by Washington University and the University of Hiroshima and is an open-source software library that enables augmented reality applications to be built using accurate computer vision-based tracking techniques. For the application interface, the software Open GL may be used. OpenGL provides a library of 2D and 3D functions including modeling alterations, color, light and shade functions. Microsoft Vision SDK is a library for writing programs to perform image manipulation and analyses on computers. The augmented reality software includes algorithms for drawing graphics, such as points and lines, transferring positions and orientations between different coordinate systems, extracting and generating a sequence list of positions and orientations, capturing process related information, and drawing advanced graphics, such as color-coded points and lines representing paint strokes with different widths and orientations.

Display member 9 may comprise a graphical user interface for the operator or another user to use in reviewing and/or editing the waypoints prior to generating robot programming code. Display member 9 may be comprised with a tracking system unit arranged attached to it. It may also be comprised as a portable handheld device.

The present invention is not limited to the embodiments disclosed but may be varied and modified within the scope of the following claims. For example, the present system is not limited to augmented reality systems utilizing a composed video image but may also be utilized in optical see-through augmented reality systems, in which only the computer generated graphics are presented to the user who views the graphics on a see-through lens with the real world in the background.

Other interaction techniques, such as voice and tactile interfaces, a mechanical or electrical interaction means may also be combined with the gestures to interact efficiently with the system.

The record command could be provided by the operator pushing a push button with one hand meanwhile he points out the waypoint with his other hand.

It is possible to use different parts of the body for pointing out waypoints and for providing gestures representing commands and information. For example one hand is used for pointing out the waypoints and the other hand or the head is used for providing the record command.

The visual feedback may be combined with another type of feed-back such as visual, audio, or tactile feedback, e.g. vibration, temperature, smell and taste.

It is also possible to recognize the movements or the position of the pointing part of the body and the gestures, directly via one or more data gloves.

The invention claimed is:

1. A method in connection with off-line programming of an industrial robot, comprising teaching the robot a path having a number of waypoints located on or in the vicinity of at least one object to be processed by the robot, the method comprising:
   obtaining information about the position of a part of a body of an operator pointing with said part at a point on or in the vicinity of the object,
   determining the position of the point being presently pointed at by said part of the body, in relation to the object, based upon said obtained information,
   generating a visual feed-back to the operator of the position of the point being presently pointed at by said part of the body in relation to the object,
   storing the position of said point being presently pointed at by said part of the body as a waypoint upon receiving a recording command, and
   generating robot programming code based upon the stored waypoint.

2. The method according to claim 1, wherein said generation of a visual feed-back to the operator comprises:
   generating a graphical representation of the point being presently pointed at by said part of the body of the operator, and
   displaying a view comprising the object and said graphical representation projected on the object.

3. The method according to claim 2, wherein the method further comprises:
   obtaining an image of the object,
   registering the generated graphical representation of the point to the image of the object to provide a composite augmented reality image, and
   displaying a view showing the object and said graphical representation projected on the image of the object.

4. The method according to claim 2, wherein said displaying step further comprises generating a graphical representation of the stored waypoint and displaying a view comprising the object and said graphical representation projected on the object.

5. The method according to claim 2, further comprising:
   generating a graphical representation of the path between the latest stored waypoint and the point being presently pointed at by said part of the body of the operator and displaying a view comprising the object and said graphical representation projected on the object.

6. The method according to claim 2, further comprising:
   generating a graphical representation of the path between at least some of the stored waypoints and displaying a view comprising the object and said graphical representation projected on the object.

7. The method according to claim 1, wherein obtaining information about the position of said part of the body comprises:
  obtaining an image of the object and of said part of the body, and
  determining the position of the point being presently pointed at by said part of the body in relation to the object based upon said image.

8. The method according to claim 1, further comprising:
  obtaining information about the orientation of said part of the body,
  storing the orientation and position of said part of the body as a waypoint upon receiving the recording command, and
  generating said robot programming code based upon the stored waypoint.

9. The method according to claim 1, wherein said part of the body is a finger, and/or a hand, and/or an arm.

10. The method according to claim 1, further comprising:
  storing at least one predefined gesture representing a specific command,
  obtaining information about the configuration and/or movements of at least a part of the body of the operator,
  recognizing a gesture based on the obtained information about the body, and
  interpreting the command by comparing the recognized gesture with said predefined gesture representing the command.

11. The method according to claim 10, wherein said obtained information is hand motion gestures.

12. The method according to claim 10, wherein said predefined gesture represents the recording command, and the recording command is identified by comparing the recognized gesture with said predetermined gesture representing the recording command.

13. The method according to claim 10, further comprising:
  storing a plurality of predefined gestures, each representing a specific command,
  recognizing gestures based on the obtained information about the body,
  interpreting the recognized gestures by comparing a recognized gesture with the stored predefined gestures, and
  executing the command represented by the recognized gesture.

14. The method according to claim 1, further comprising:
  storing a plurality of predefined gestures, each representing a specific piece of process related information or an process event,
  obtaining information about the configuration or movements of at least a part of the body of the operator,
  recognizing gestures based on the obtained information about said part of the body,
  interpreting the recognized gestures by comparing a recognized gesture with the stored predefined gestures, and
  generating robot programming code based upon the process related information or process event represented by the recognized gesture.

15. A computer program directly loadable into the internal memory of a computer or a processor, comprising:
  software code portions for performing the steps of claim 1, when said program is run on a computer.

16. A computer readable medium having a program recorded thereon, where the program is to make a computer perform the steps of claim 1, when said program is run on the computer.

17. A system for use in connection with off-line programming of an industrial robot, the programming comprises teaching the robot a path having a number of waypoints located on or in the vicinity of at least one object to be processed by the robot, the system comprising:
  a tracking system unit adapted for providing information about the position of a part of the body of an operator pointing by said part at points on or in the vicinity of the object,
  a visual feed-back unit generating a visual feed-back to the operator of the position of the point being presently pointed at by said part of the body, in relation to the object, and
  a storage unit adapted for storing the position of said part of the body as a waypoint upon receiving a recording command.

18. The system according to claim 17, further comprising:
  a graphical generator operative to generate a graphical representation of the point being presently pointed out by said part of the body, and
  a display member operative to display a view comprising the object and said graphical representation projected on the object.

19. The system according to claim 18, further comprising:
  a camera adapted for delivering an image of the object, and
  means for registering the generated graphical representation of the point to the image of the object, to provide a composite augmented reality image
  wherein the display member is adapted for displaying a view comprising the object and said graphical representation projected on the image of the object.

20. The system according to claim 18, wherein the graphical generator is adapted to generate a graphical representation of the stored waypoint.

21. The system according to claim 18, wherein the graphical generator is adapted to generate a graphical representation of the path between the latest stored waypoint and the point presently being pointed out.

22. The system according to claim 17, further comprising:
  a camera adapted to deliver an image of at least said part of the body,
  wherein the pose determining unit is adapted to determine the position of the part of the body in relation to the object based upon said image of the part of the body.

23. The system according to claim 17, wherein said part of the body is a finger, and/or a hand, and/or an arm.

24. The system according to claim 17, further comprising:
  a robot programming-code generator operative to generate robot-programming code based upon the stored waypoint.

25. The system according to claim 17, wherein said tracking system unit is adapted for providing information about the configuration or movements of at least a part of the body of the operator, and the system further comprising:
  a command storage unit adapted for storing predefined gestures representing specific commands,
  a gesture recognition unit operative to recognize gestures based on the provided information about the body, and
  a gesture interpretation unit operative to interpret the recognized gestures by comparing the recognized gestures with said predefined gestures and providing commands based on the interpretation.

26. The system according to claim 17, further comprising:
- a process information storage unit adapted to store a plurality of predefined gestures, each representing a specific piece of process related information or a process event,
- a gesture recognition unit operative to recognize gestures based on the provided information about the body,
- a gesture interpretation unit operative to interpret the recognized gestures by comparing a recognized gesture with said predefined gestures and providing the process related information or the process event based on the interpretation.

27. The system according to claim 17, wherein said tracking system unit is adapted to determine the orientation of said part of the body in relation to the object, based upon said provided information, and wherein said storage unit is adapted to store the position and orientation of said part of the body as a waypoint upon receiving the recording command.

28. Use of a system according to claim 17 for programming one or more robots and/or automation applications to carry out an operation comprising any from the list of: welding, riveting, de-burring, fettling, grinding, coating, painting, dry spraying, gluing, folding plate, bending plate, hemming plate, gripping an object, manipulating an object, stacking, pick and place.

29. Use of a system according to claim 17 for programming a mobile robot in an industrial installation or commercial installation or health care facility or place of work.

* * * * *